United States Patent

[11] 3,578,811

[72] Inventors: Friedrich-Karl Bassier, Eppinghoven/uber, Dinslaken; Hans Tekathen, Dinslaken Niederrhein, Germany
[21] Appl. No.: 847,964
[22] Filed: Aug. 6, 1969
[45] Patented: May 18, 1971
[73] Assignee: Gebr, Eickhoff, Maschinenfabrik und Eisengiesserei m.b.H. Bochum, Germany
[32] Priority: Aug. 10, 1968
[33] Germany
[31] P 17 58 809.9

[54] ROLLER CUTTER
3 Claims, 4 Drawing Figs.
[52] U.S. Cl. .................................................. 299/45
[51] Int. Cl. ............................................. E21c 27/24, E21c 35/20
[50] Field of Search ................................. 299/43, 45, 67

[56] References Cited
UNITED STATES PATENTS
3,291,533  12/1966  Rae ............................. 299/45
3,482,879  12/1969  Droste et al. ................. 299/45
FOREIGN PATENTS
1,123,251  8/1968  Great Britain ................ 299/45

Primary Examiner—Ernest R. Purser
Attorney—Walter Becker

ABSTRACT: A mining machine having a cutting roller supported by a pivotable supporting arm and rotatable about a horizontal axis, in which said cutting roller is equipped with a conveying shield pivotable about the axis of said roller while a ramp is connected to the machine carriage and ascends from the floor of the seam of the rock being mined to the upper edge of the long wall conveying means, both ends of said ramp carrying confining walls curved in conformity with the curvature of the conveying shield and arranged adjacent one edge of said shield, said confining walls in either one of two end positions of said conveying shield closing off the space between the conveying shield and the long wall conveying means.

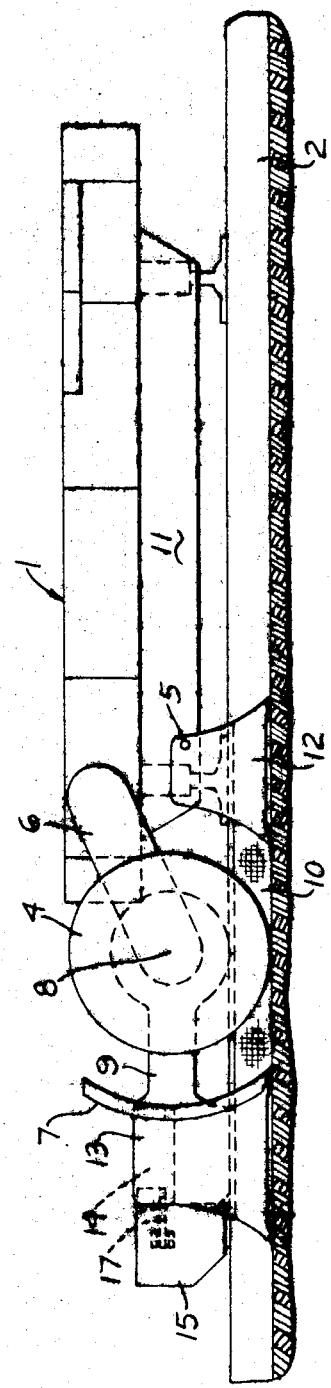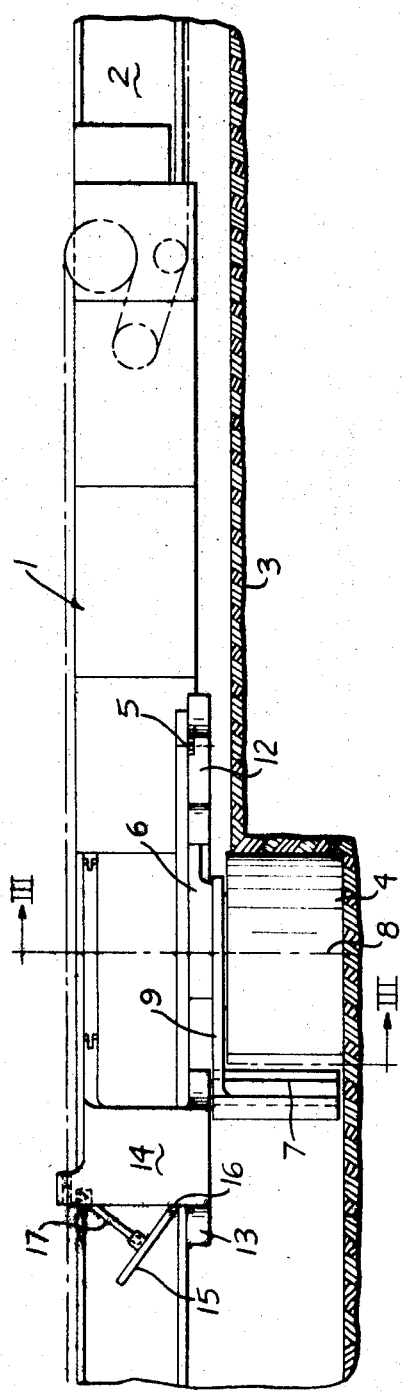

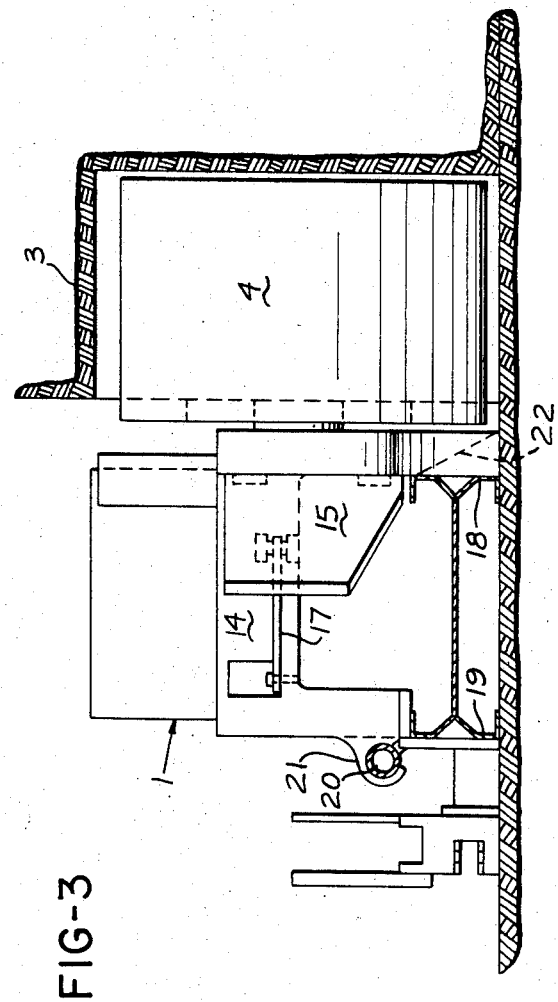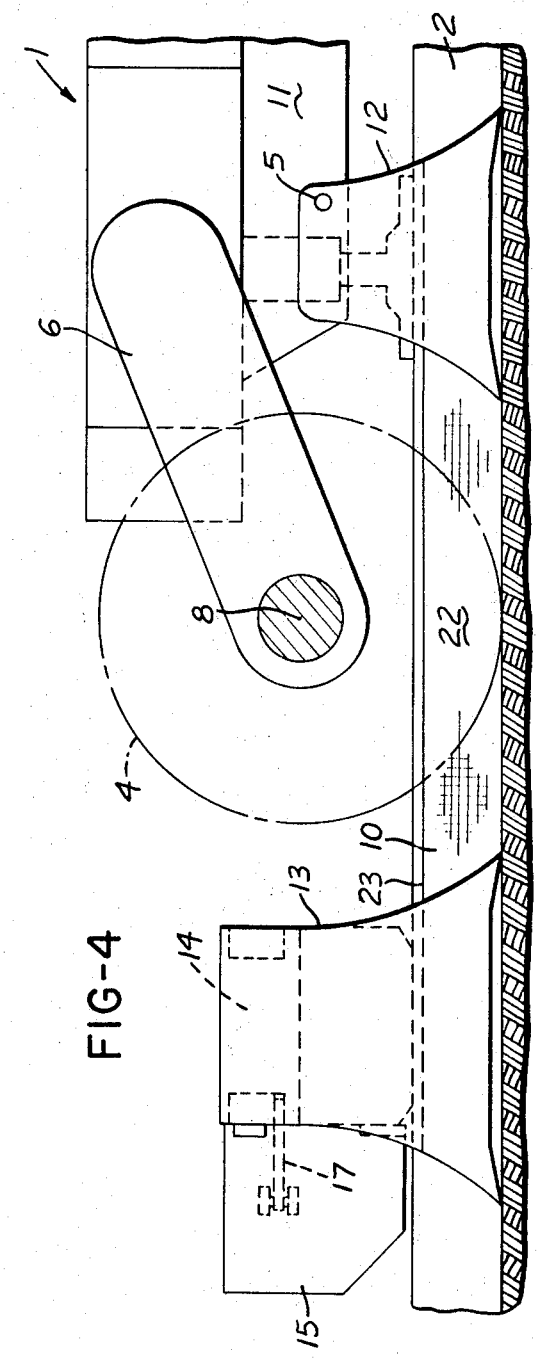

ROLLER CUTTER

The present invention relates to an arrangement on roller cutters which are movable on the long wall conveying means (strebfordermittel) and mine the rock bed with a rotating cutting roller which laterally protrudes into the face of the working and is rotatable about a vertical axis. A supporting arm which is pivotable about a horizontal housing axis supports the cutting roller so as to be adjustable along the vertical plane, and also supports the conveying plate (Raumschild) which is pivotable about the roller axis. This plate is intended in cooperation with helical follower strips extending over the circumference of the cutting roller to convey the cut-loose material, the so-called heap, to the long wall conveying means. The said conveying plate is arched in conformity with the head path defined by the cutting chisels.

In conformity with the driving direction of the cutting machine, the conveying plate is always pivoted in such a manner that it is located behind the cutting roller. By means of a cutting plate designed and journaled in this manner, a major portion of the loosened material or heap can be conveyed directly by the rotating cutting roller into the long wall conveying means. However, the yield field cannot be kept clear to such an extent that the long wall conveying means can be located directly therebehind the roller cutting machine. A 100 percent transfer of the heap fails in view of the space between the edge of the conveying plate at the machine side and the wall of the long wall conveying means at the side of the seam.

It is an object of the present invention with roller cutting machines movable in both directions and having the cutting roller journaled on a pivotable supporting arm and equipped with a conveying plate pivotable about its axis of rotation, so to improve the flow of the heap toward the long wall conveying means and to create a gapless transfer of the loosened mineral from the conveying shield or plate to the long wall conveying means.

This object and other objects and advantages of the present invention will appear more clearly from the following specification in connection with the accompanying drawings, in which:

FIG. 1 is a plan view of a roller cutting machine according to the invention.

FIG. 2 is a side view of the roller cutting machine.

FIG. 3 represents a cross section taken along the line III—III of FIG. 1, but on a larger scale than the latter.

FIG. 4 is a cutout portion of FIG. 2 but likewise at a considerably larger scale than FIG. 2, while omitting the cutter roller.

According to the present invention, the machine carriage has connected thereto an ascending ramp which ascends from the floor of the seam to the upper edge of the long wall conveying means. The said ramp which extends from the floor of the seam to approximately the height of the sidewall of the conveyor means at both ends of the arc carried cover plates which are adjacent to that edge of the conveying shield which is located on the conveyor side, and in both installations of the conveying shield covers the space between the conveying shield and the long wall conveying means. By means of the ramp and the two cover plates, it is not only possible in both locations of operation of the conveying shield to form a guiding surface extending beyond the long wall conveying means and intended for the flow of heap leading to the long wall conveying means but also brings about a better transferring of the heap located at the floor of the seam to the long wall conveying means.

The heretofore known conveying shields or plates were held by two parallel struts or the like arranged within the area of the upper and lower edge of the shield while the lower strut interferes with the flow of the main heap. With the new arrangement according to the present invention, an arm extending radially toward the axis of the cutter roller engages the conveying shield or plate at its central portion whereby the space above the floor of the seam will be freed for the flow of the heap. The closure plate which is located on that roller cutter side which faces away from the machine body has associated therewith a guiding plate which is adapted to be arrested. In view of this plate, the flow of the heap leading into the long wall conveying means is passed up to the center of the long wall conveying means and thereby prevents that with particularly large heap yield, behind the conveying shield, a portion of the heap will again drop upon the floor of the seam into the cutting lane.

Referring now to the drawings in detail, the roller cutting machine 1 is displaceably on the long wall conveying means 2. By means of its cutting roller 4 which laterally protrudes into the face of the working 3, in other words which at the end of a supporting arm 6 is pivotable about a housing axis, the roller cutting machine breaks up the seam. Follower strips which are arranged on the circumference of the cutting roller but are not illustrated, carry the heap into the conveyor medium 2 while they are supported by the shield or plate 7. Shield or plate 7 is arched in conformity with the head path of the nonillustrated cutter chisels and is held by a radial arm 9 which extends toward the cutting roller axis 8 and is pivotable thereabout. In this way, arm 9 may be pivoted about the cutting roller 4 onto one or the other roller side and may be arrested in either one of these two positions of operation. In both positions of operation, the shield or plate closes in the longitudinal direction of the long wall the space intersected by the cutting roller 4 and thereby aids the discharge of the heap.

According to FIG. 3, the two lateral walls 18 and 19 of the conveyor means are visible and also the guiding pipe 20 which is embraced by the guiding jaw 21 of the carriage of the machine. A ramp 10 with its inclined loading surface 22 extends up to the edge 23 which is located slightly below the upper edge of the sidewall 18 of the conveyor.

The central ramp portion 22a has adjacent thereto the closure plates 12 and 13. All three parts form a rigid body which at 5 is pivotally connected to the machine carriage 11 which carries the machine body and rests on the long wall conveyor means 2. The carriage 11 is, during the working operation of the cutting roller carried along by the machine 1.

From FIG. 2 and in particular from FIG. 4 it will be evident that the inner surfaces of the cover plates 12 and 13 are adapted to the shape of the conveying shield or plate 7. In the respective position of operation of the plate 7, the respective cover plate 12 or 13 bridges the space between the edge of the plate 7 and the long wall conveying means 2 and brings about a transfer of the heap to the conveying means. The cover plate 13 which is located on that side of the roller which faces away from the roller cutter, has associated therewith a portal 14 extending over the long wall conveying means 2. The portal 14 rests on both sides of the long wall conveyor means and is guided thereon. Portal 14 has pivotally mounted thereon a guide plate 15 which is pivotable about the vertical axis 16. Plate 15 is adapted by means of a plate 17 to be held in its position of operation. In this position the plate 15 has its free end protruding beyond the long wall conveying means and presses the main heap flow which passes toward the long wall conveying means more into the center of the conveyor.

It is, of course, to be understood that the present invention is, by no means, limited to the particular construction shown in the drawings, but also comprises any modifications within the scope of the appended claims.

We claim:

1. A mining machine having a carriage and a cutting roller rotatable about a horizontal axis and a conveying shield substantially coaxial with and pivotable about said cutting roller, said conveying shield having a curved surface facing said cutting roller and being curved in conformity with the curvature of said roller, said mining machine also including ramp means connected to said carriage and ascending from a lower plane close to the floor of a seam when said mining machine is in mining position to an upper plane for appropriate alignment with the upper edge of a long wall conveyor means, confining wall means connected to said ramp means at both ends thereof, each of said confining wall means having a curved surface facing said cutting roller and being curved in conformity with the curved face of said conveying shield, said conveying shield being pivotable from a first position in front of said roller to a second position in the rear of said roller and vice versa, said confining wall means in either one of said first and second positions of said conveying shield being adjacent one lateral edge of said conveying shield for covering up the space between said conveying shield and a long wall conveying means.

2. A mining machine according to claim 1, which includes holding arm means extending radially with regard to said roller and having one end connected to the substantially central portion of said conveying shield and having its other end pivotable about the axis of said roller.

3. A mining machine according to claim 1, in which that one of said convining wall means which is located on that side of said roller that faces away from the body of the mining machine has associated therewith guiding plate means pivotable about a vertical axis into a position for extending over the long arm conveying means, and means for arresting said guiding plate means in said last-mentioned position.